Aug. 23, 1938.    J. D. RYDER    2,127,846
MEASURING APPARATUS
Original Filed March 25, 1933

INVENTOR
John D. Ryder
BY
*Raymond A. Junkins*
ATTORNEY

Patented Aug. 23, 1938

2,127,846

UNITED STATES PATENT OFFICE 2,127,846

MEASURING APPARATUS

John D. Ryder, South Euclid, Ohio, assignor to Bailey Meter Company, a corporation of Delaware Original application March 25, 1933, Serial No. 662,848. Divided and this application January 2, 1936, Serial No. 57,158

13 Claims. (Cl. 175—183)

This invention to measuring apparatus which is readily adapted to determine the magnitude of any physical, electrical, thermal, chemical or other variable condition, quantity, or quality, such for example as fluid rate of flow, temperature, pressure, electrical current, etc.

In accordance with my invention, I cause to be produced an electrical effect proportional in magnitude to the magnitude of the condition or variable to be measured and then by a suitable measuring circuit, forming a part of my improved measuring apparatus, I determine the magnitude of the electrical effect, or obtain a measurement representative of such magnitude.

A primary object of my invention is to provide a measuring apparatus capable of exhibiting variations in, or the actual value of, the magnitude of a condition or variable substantially instantaneously with the occurrence of such variations and so that an observer will be advised of the magnitude of the condition at any time existing, and not of the magnitude which existed at some time previously, except insofar as such condition might be recorded for permanent record. In other words, to avoid a time delay between the occurrence of a change in magnitude and the presentation of such change for observation upon a measuring instrument which is now the usual practice in many types of measurement.

Another object of the invention is to provide measuring apparatus wherein no appreciable work is required of the galvanometer, milli-voltmeter, milli-ammeter or other instrument deflecting in accordance with variations in the electrical effect indicative of changes in the magnitude of the condition, so that a high order of accuracy is obtained.

A further object of the invention is to provide improved measuring apparatus wherein the power present in small electrical effects, may be amplified to any desired value so that ample power is available for the operation of indicating, recording, or other types of measuring devices. At present it is only possible to indicate very minute electrical voltages or currents as they have not inherently sufficient power to actuate recording devices, and it is to overcome such difficulties that I propose my improved arrangement wherein the power of minute electrical effects is sufficiently amplified in simple and novel manner to provide power necessary for recording or other measuring instruments.

A still further object is to provide apparatus of this type wherein a value to be measured is continuously recorded in contradistinction to measuring apparatus at present in commercial usage, which is of the periodically actuated or step-by-step type wherein the value of the variable or condition is indicated or recorded only periodically and not continuously. Such improvement predicates the substantially instantaneous advising of the value of variables as compared to the introduction of a time delay in waiting for periodic mechanisms to be actuated.

My invention has for a further object the provision of measuring apparatus which is affected only by changes in the magnitude of the condition to be measured, and wherein such apparatus is affected in substantially no degree by varying ambient conditions, such as pressure, or temperature, or variations in the resistance, available potential, or other electrical properties of the electric circuit employed.

The invention is characterized by measuring apparatus of the null or balanced type, wherein an electrical effect bearing a functional relation to the magnitude of a condition is caused to exert a force proportional to its magnitude, which force is balanced against a predetermined known force and one or the other of the forces varied until they stand at equal or predetermined ratio to each other, and whereafter the sensitive device, such as a galvanometer, is in a neutral or balanced position.

An important advantage of my improved measuring apparatus over that now known is that the current through a variable impedance may be automatically varied for re-balancing the system without the transformation of electrical energy to mechanical energy, or vice versa. In other words, the opposing force is varied electrically and the balance is automatically electrical by nature with no intermediate mechanical step such as is now common practice in known torque amplifying devices and arrangements.

My invention also relates to apparatus of the character referred to, wherein the condition to be measured may be caused to produce an impedance proportional to its magnitude as, for example, is produced by a resistance thermometer and wherein the current in the impedance is varied to maintain the potential difference across the impedance at a predetermined constant magnitude whereby the current is a measure of the condition.

Figure 1:
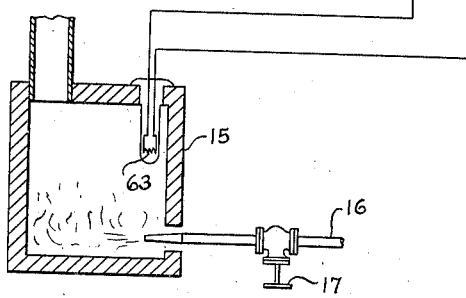
Fig. 1 is a diagrammatic illustration of one elementary circuit or form of my invention.
Figure 1:
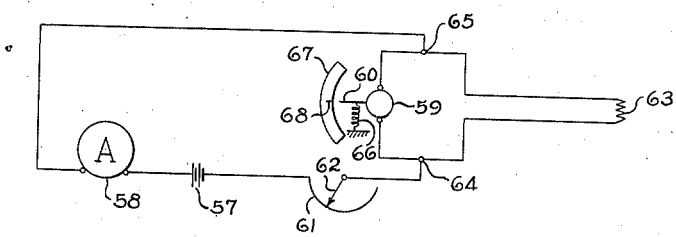

Basically, considering the elemental circuit shown in Fig. 1, I provide a galvanometer circuit wherein a sensitive element, such as the galvanometer mentioned, moves responsive to the value of a variable condition to be measured. In connection therewith, I provide a measuring circuit of the variable at amplified power. Further than this, I have an impedance common to the two circuits, namely, to the galvanometer circuit and to the measuring circuit and which impedance in general constitutes a resistance through which is applied a varying or varied current.

It is, of course, to be understood that the drawing and specification relating thereto serve to illustrate and describe preferred embodiments of my invention and are not to be considered as limitations. My improved measuring apparatus is of a broad nature, to be arranged and utilized in numerous ways, of which I have illustrated and will describe certain preferred embodiments.

Figure 2:
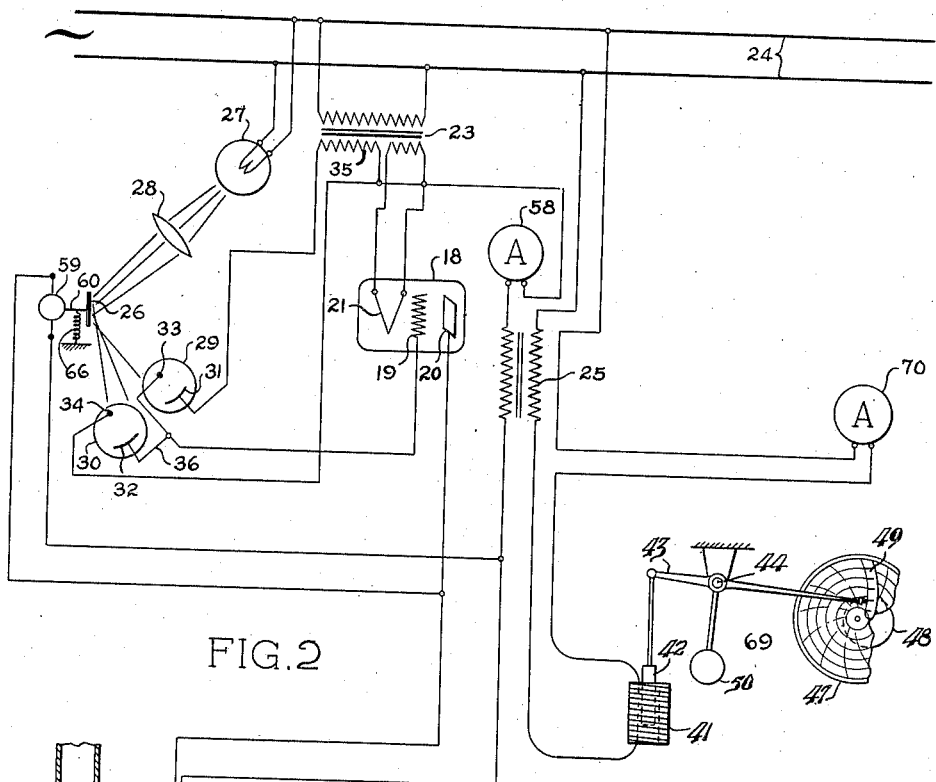
Fig. 2 is a diagrammatic illustration embodying the elemental circuit of Fig. 1.

In Figs. 1 and 2 I show an embodiment of my measuring apparatus, particularly adapted and illustrated to measuring a condition, such as temperature, by a resistance thermometer. A resistance forms a common part between two loop circuits, namely, a galvanometer circuit and a measuring circuit. It is to be understood, however, that I have chosen to illustrate and describe this particular embodiment as serving to illustrate one form of my improved apparatus and that in other forms it is readily adapted to determine the magnitude of any condition, or quantity, or variable which may be made to vary the value of an impedance in accordance with changes in its magnitude.

Referring specifically to Fig. 1, I show therein an elemental circuit comprising in the measuring circuit a source of potential 57, a current measuring device 58, and in the galvanometer circuit, a galvanometer 59 having a movable needle 60. Further, in the measuring circuit is shown a slide wire resistance 61 and a contact arm 62. This may be manually moved along the slide wire so that the magnitude of the current in the circuit may be brought to any desired value. The impedance, varying in accordance with the condition or quantity to be measured, is shown as a resistance thermometer 63, connected at 64, 65 in common to the galvanometer circuit and to the measuring circuit. The potential difference created by the resistance thermometer 63, due to the current in the circuit, will then be impressed on the galvanometer. So that deflections of the movable member 60 may be proportional to the potential difference across the resistance thermometer, I show it biased toward its initial or zero position by a spring 66, although such biasing means may be a different type of spring, or weight loading, or as desired.

A thermometer, such as the resistance 63, may be composed of metal, the electrical resistance of which varies in proportion to changes in the temperature to which it is exposed. It follows that I may, by maintaining a constant potential difference across the resistance thermometer, utilize the current necessary to maintain that potential difference as a measure of the temperature. Inasmuch as most metals suitable for use as a resistance thermometer have a positive temperature coefficient, that is, the resistance of the material varies directly with the temperature, it follows that the current necessary to maintain a predetermined potential difference across the thermometer will vary inversely with the temperature. However, I may, if desired, construct the thermometer of a material such as carbon, having a negative temperature coefficient, whereby the current necessary to maintain a predetermined potential difference across the thermometer will vary directly with the temperature to which the thermometer is exposed.

In the form of the invention illustrated in Fig. 1, I contemplate maintaining a current in the measuring circuit sufficient to maintain a predetermined constant potential difference across the resistance thermometer 63 regardless of changes in temperature to which it is exposed. I assume the use of a material having a positive temperature coefficient and will establish, while the thermometer is exposed to some predetermined minimum temperature, a current in the measuring circuit sufficient to give a desired deflection of the movable member of the galvanometer 59. For example, a current sufficient to deflect the movable member from a point adjacent the lowest end of a cooperating scale 67, which may be the initial position of the movable member, to a point adjacent the mark 68. Thereafter, by proper manipulation of the contact arm 62, I will so vary the effective resistance of the measuring circuit that the movable member 60 will remain in its deflected position adjacent the mark 68, regardless of variations in the resistance 63 due to temperature changes. It is apparent that the current necessary to maintain the predetermined deflection of the movable member will be inversely proportional to the temperature to which the thermometer 63 is exposed, and a measuring device such as the ammeter 58 may be calibrated to read directly in units of temperature.

In Fig. 2, I illustrate a further form of the circuit shown in elemental form at Fig. 1, and wherein the deflections of the movable member 60 are automatically effective for maintaining a current in the measuring circuit sufficient to maintain the potential difference across the resistance thermometer at a predetermined value. This I accomplish in substantially the same way as described relative to Fig. 1.

Referring now to Fig. 2 I have illustrated therein a more complete showing of my measuring apparatus wherein in connection with the elemental circuit of Fig. 1 I provide means for automatically varying the current in the measuring circuit to maintain a constant potential difference across the resistance 63. Thus the galvanometer 59 is at all times in a predetermined position, or if it departs therefrom due to variations in the temperature to which the resistance 63 is sensitive, it is immediately returned to said position by the automatic means to be described. Correspondingly the value of the current in the measuring circuit is continuously representative of the value of the temperature to which the resistance 63 is sensitive or to departure of such temperature from a predetermined standard.

I show in Fig. 2 the resistance 63 exposed to and sensitive to the temperature in a furnace 15. The furnace is supplied with fuel through a supply line 16 in which a valve 17 is positioned in any desired manner to control the rate of supply of fuel to the furnace and consequently the temperature to which the resistance 63 is sensitive.

The resistance 63 forms a part of the output circuit of a suitable electronic discharge device shown as a thermionic valve 18, having a control grid 19, an anode 20 and a cathode 21, which latter is provided with suitable heating current by the secondary of a transformer 23, the primary of which is connected across an alternating current power line 24. Also connected in the output circuit is the current measuring device 58 and the secondary of a transformer 25, which latter provides a source of current for producing a potential difference across the resistance 63 by inductively coupling the output circuit of the electronic discharge device to the alternating current power supply line 24.

As is well known an electron discharge device, such as a thermionic valve which I have indicated at 18 may be rendered more or less conducting to the passage of current by controlling the potential relation between its grid and cathode. Usually when the means provided, generally called the input circuit for energizing the grid, impresses on the grid a potential negative by a predetermined amount with respect to the potential of the cathode, the device is rendered non-conducting and the conductivity is increased in direct proportion as the potential of the grid becomes greater with respect to that of the cathode, until the grid potential bears some predetermined relation to that of the cathode potential. Then the device is conducting to its fullest extent and further increases in grid potential have no effect on the conductivity. This inherent characteristic of such an electron discharge device may be readily utilized to maintain the potential difference across the resistance 63 constant, so that the current in the output circuit of the electron discharge device is proportional to the temperature to which the resistance 63 is subjected.

A feature of my invention lies in the means I have provided for automatically controlling the potential relation between the cathode and the grid of the electron discharge device.

I have shown in Fig. 2 the movable needle 60 of the galvanometer 59 provided with a light mirror 26. Angularly disposed from the mirror at a suitable distance is a light source 27 from which light rays after passing through a lens 28 strike the mirror 26 and are reflected upon photoelectric cells 29 and 30 suitably disposed relative to the source and the mirror. The cells 29, 30 are provided with cathode 31, 32 and anodes 33, 34 respectively. The cathode 31 is connected to one side of the secondary 35 of the transformer 23. The other side of the secondary 35 is connected to the cathode 21 of the electron discharge device 18. The anode 33 of the photocell 29 is connected to the cathode 32 of the photocell 30 by a conductor 36. The anode 34 is connected to the opposite side of the secondary 35 than is cathode 31. The grid 19 of the device 18 is connected to the conductor 36.

It is to be noted that I have herein provided a circuit arrangement whereby the grid 19 may be rendered sufficiently negative with respect to the cathode 21 so that the device 18 will be non-conducting, which condition will be established when the majority of the light reflected by the mirror 26 falls on the photocell 29. Likewise when the majority of the light reflected by the mirror 26 falls on the photocell 30 the potential of the grid 19 will be substantially that of the cathode 21 so that the device 18 will be at the point of highest conductivity for the circuit arrangement shown. It is apparent that between these two extremes the electron discharge device 18 will be rendered more or less conducting, depending upon the relative amounts of light falling on the cells 29 and 30. It is to be understood, however, that I have merely illustrated one form of circuit arrangement and that broadly my invention contemplates varying the grid potential with respect to that of the cathode over any range necessary in order to obtain the necessary variations in the current in the output circuit of the electron discharge device 18.

Inasmuch as the mirror 26 is secured to and carried by the movable member 60 of the galvanometer 59 it will be deflected from a neutral position whenever the potential existing across the resistance 63 varies from the predetermined value. Deflection of the mirror will be effective for controlling the amount of light to which the photocell 29 is subjected relative to that which the photocell 30 is subjected, so that the electron discharge device 18 will be rendered more or less conducting in accordance with the position of the mirror 26 and correspondingly in accordance with the potential difference across the resistance 63.

Utilizing for the resistance thermometer 63 a material having a positive temperature coefficient, I usually prefer to so arrange the mirror 26 that when the temperature within the furnace is at the minimum value which it is desired to indicate and/or record the most or all of the light rays from the source 27 will be reflected on to the photocell 30, thus impressing on the grid 19 a potential substantially equal to that of the cathode 21, so that the maximum current will exist in the output circuit of the device 18, which as shown includes the resistance thermometer 63. Thereafter as the temperature within the furnace increases, increasing the resistance of the thermometer, the movable member of the galvanometer will tend to deflect so that more light rays are reflected on to the photocell 29 and less on to the photocell 30, thus decreasing the potential of the grid 19 relative to that of the cathode 21 so that less current will exist in the output circuit of the electron discharge device.

It is therefore evident that as the potential across the resistance 63 increases, due to an increase in temperature within the furnace 15, the deflection of the needle 11 will be effective for increasing the amount of light to which the photocell 29 is subjected and decreasing the amount of light to which the photocell 30 is subjected, thereby decreasing the potential of the grid 19 with respect to the cathode 21 and decreasing the current in the resistance 63 until the potential difference across the resistance is substantially restored to the predetermined value. Thereafter there will be no further movement of the deflecting member 60 until there is a further difference in potential. The index or other deflecting element of the current measuring device 58 will, therefore, be deflected in accordance with changes in the temperature and by proper calibration may be made to indicate and/or record directly in units of temperature. In other words, upon any change in temperature surrounding the resistance 63 the movable member 60 will deflect until the current in the output circuit has changed sufficiently to substantially reestablish the predetermined potential difference across the resistance 63.

It may be found desirable to maintain a low value of current in the output circuit of the electron discharge device with a relatively high value of potential. In order that I may have ample current available for operating any number of recording, indicating or other measuring devices I may, as illustrated, place the measuring devices in the primary circuit of the transformer 25. I have by way of illustration shown connected in this primary circuit a current measuring device, such as an ammeter 70, somewhat similar to the ammeter 58 but of more rugged construction and a recording device generally indicated at 69. By proper design of the transformer 25 a relatively large current in the primary circuit may be produced for a given current in the secondary. Inasmuch as the current in the primary circuit will vary with the current in the secondary, it follows that the current to which the devices 69 and 70 are sensitive will be proportional to the temperature surrounding the resistance 63 and the devices 69 and 70 may be graduated to read directly in terms of temperature.

The recording device 69 is shown more or less diagrammatically but is essentially an ammeter comprising a coil 41 having a movable core 42 pivotally suspended from one end of a beam 43 oscillatable about a pivot 44. The beam carries at its other end an indicator movable relative to an index 49 and further comprises a marketing pen moved over recording chart 47, which latter is turned at a uniform speed by a clock mechanism 48. So that the motion of the beam may vary in any functional relation desired to the current in the coil 41, the beam is provided with a pendulum 50 to create an opposing force substantially proportional to its angle of inclination with the vertical, but other means of providing opposing force may be used if desired. In general it is to be understood that the device 69 is shown merely by way of illustration.

The devices 69 and 70 will, of course, be arranged with the necessary counterbalancing or biasing to take into account actual values of current as well as direct or inverse relation between current and temperature.

While I have chosen to illustrate and describe an improved measuring apparatus as used to determine temperature, it is to be understood that I am not to be limited thereby and that my invention broadly contemplates any apparatus suitable for determining the magnitude of a condition, or quantity, or variable, and operating under the same or substantially similar principles to those which I have illustrated and described.

While I employ a null or balanced method, I have eliminated mechanical steps between electrical steps, by causing my re-balancing to be done automatically and electrically without the interposing of mechanical actuation. I utilize broadly a fixed impedance or resistance through which is passed a current which may be varied; as compared to known circuits which provide for varying the resistance and holding the current constant. Through my arrangement decided improvement in speed and accuracy of operation is obtained, as well as simplicity of the apparatus, and many novel results resulting therefrom.

This application is a division of my application for United States Letters Patent, Serial No. 662,848, filed in the United States Patent Office March 25, 1933, for measuring apparatus.

What I claim as new, and desire to secure by Letters Patent of the United States, is:—

1. The combination with a galvanometer having a movable member, of means for producing a deflection of said member, said means including a variable impedance and a source of current associated with the galvanometer for producing a potential effective for deflecting the member, an electron discharge device having an input circuit and an output circuit, said output circuit including the source of current and the impedance, and means controlled by the movable member for regulating the energization of the input circuit.

2. The combination with a galvanometer having a movable member, of means for producing a deflection of said member, said means including a variable impedance and a source of current associated with the galvanometer for producing a potential effective for deflecting the member, an electron discharge device having an input circuit and an output circuit, said output circuit including said source of current and said impedance, photo-sensitive means for regulating the energization of said input circuit, and means operated by said movable member for controlling said photo-sensitive means.

3. In combination, an impedance varying in accordance with the magnitude of a condition, a source of current for producing a current in said impedance, an electron discharge device having an input and an output circuit, said output circuit including said source of current and said impedance, means for determining the potential difference across said impedance, means controlled by the last-named means for regulating the energization of the input circuit to maintain said potential difference at a predetermined magnitude, and means for obtaining a measure of the current in said output circuit.

4. In combination, an impedance varying in accordance with the magnitude of a condition, a source of current for producing a current in said impedance, an electron discharge device having an input and an output circuit, said output circuit including said source of current and said impedance, means for determining the potential difference across said impedance, photo-electric means for regulating the energization of said input circuit, and means operated by said first-named means for controlling said photo-electric means.

5. In combination, an impedance varying in accordance with the magnitude of a condition, a source of current for producing a current in said impedance, an electron discharge device having an input and an output circuit, said output circuit including said source of current and said impedance, means for determining the potential difference across said impedance, photo-electric means controlled by said last-named means for regulating the energization of the input circuit to maintain said potential difference at a predetermined magnitude, and means for obtaining a measure of the current in said output circuit.

6. In an electrical measuring system, means for converting variations in a physical magnitude into displacements of a light beam in two directions from a predetermined normal position, light-sensitive current-passing means responsive to said light beam when displaced in either direction from normal position, and a measuring circuit controlled by said light sensitive means and cooperating with said first mentioned means to restore said beam to normal position, said first mentioned means including a galvanometer connected across an impedance varying in accordance with the magnitude of an independent condition to be measured; said measuring circuit including said impedance and means for restoring said beam to normal position while maintaining the value of said impedance included in the galvanometer circuit fixed.

7. In a self-balancing galvanometer network, a galvanometer, a source of potential and an impedance operatively connected to the galvanometer, a thermionic relay for balancing the galvanometer with respect to the potential drop across the impedance, and means controlled by the galvanometer for affecting the control potential of the relay including light-sensitive current-passing means in circuit with said relay, a source of light, and means actuated by the galvanometer for controlling the degree of illumination of the light-sensitive means by the light source.

8. A device for determining the magnitude of an impedance, in combination, a bridge having as adjacent balancing arms the space paths respectively of a pair of space discharge devices, and as a conjugate arm the grid circuit of a space discharge device having an anode, a cathode, and a grid; a circuit traversed by the space current of said last named device including said impedance, high-frequency means controlling the space path resistances of said discharge devices, means responsive to the potential drop across said impedance for operatively varying said balancing arm space path resistances automatically to maintain a constant potential drop across said impedance, and exhibiting means of the current in said circuit.

9. The combination with a galvanometer having a movable member, of means for producing a deflection of said member, said means including a variable impedance and a source of current associated with the galvanometer for producing a potential effective for deflecting the member, an electron discharge device having an input circuit and an output circuit, said output circuit including said source of current and said impedance, space discharge means for regulating the energization of said input circuit, and high-frequency means under the control of said movable member for controlling said space discharge means.

10. The combination with a galvanometer having a movable member, of means for producing a deflection of said member, said means including a variable impedance and a source of current associated with the galvanometer for producing a potential effective for deflecting the member, an electron discharge device having an input circuit and an output circuit, said output circuit including said source of current and said impedance means for regulating the energization of said input circuit including high frequency means, and means operated by said movable member for controlling said high frequency means.

11. In combination, an impedance varying in accordance with the magnitude of a condition, a source of current for producing a current in said impedance, an electron discharge device having an input and an output circuit, said output circuit including said source of current and said impedance, means for determining the potential difference across said impedance, means for regulating the energization of said input circuit including high frequency means, and means operated by said first-named means for controlling said high frequency means.

12. The combination with a galvanometer having a movable member, of means for producing a deflection of said member, said means including a variable impedance and a source of current associated with the galvanometer for producing a potential effective for deflecting the member, an electron discharge device having an input circuit and an output circuit, said output circuit including said source of current and said impedance, light sensitive means for regulating the energization of said input circuit, a source of light, and means under the control of said movable member for controlling the amount of light falling upon said light sensitive means.

13. A device for determining the magnitude of an impedance, in combination, a bridge having as adjacent balancing arms the space paths respectively of a pair of light sensitive devices, and as a conjugate arm the grid circuit of a space discharge device having an anode, a cathode, and a grid; a circuit traversed by the space current of said last named device including said impedance, a source of light for controlling the space path resistances of said light sensitive devices, means responsive to the potential drop across said impedance for operatively varying said balancing arm space path resistances automatically to maintain a constant potential drop across said impedance, and exhibiting means of the current in said circuit.

JOHN D. RYDER.